United States Patent
Zhang et al.

(10) Patent No.: US 10,231,131 B2
(45) Date of Patent: Mar. 12, 2019

(54) AUTONOMOUS UPLINK (UL) TRANSMISSION IN NEW RADIO-SPECTRUM SHARING (NR-SS)

(71) Applicant: QUALCOMM Incorporated, San Diego, CA (US)

(72) Inventors: Xiaoxia Zhang, San Diego, CA (US); Juan Montojo, San Diego, CA (US); Siddhartha Mallik, San Diego, CA (US); Aleksandar Damnjanovic, Del Mar, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/649,375

(22) Filed: Jul. 13, 2017

(65) Prior Publication Data

US 2018/0206127 A1 Jul. 19, 2018

Related U.S. Application Data

(60) Provisional application No. 62/446,224, filed on Jan. 13, 2017.

(51) Int. Cl.
*H04W 72/04* (2009.01)
*H04W 74/08* (2009.01)
(Continued)

(52) U.S. Cl.
CPC ....... *H04W 16/14* (2013.01); *H04W 72/0413* (2013.01); *H04W 72/10* (2013.01); *H04W 74/0833* (2013.01); *H04W 74/0816* (2013.01)

(58) Field of Classification Search
CPC ............. H04W 72/0413; H04W 72/10; H04W 74/0833
See application file for complete search history.

(56) References Cited

U.S. PATENT DOCUMENTS

2014/0219256 A1* 8/2014 Viger .................... H04W 74/00
370/336
2014/0335812 A1 11/2014 Futatsugi et al.
(Continued)

OTHER PUBLICATIONS

Ericsson: "On Autonomous UL Transmissions for NR in Unlicensed Spectrum", 3GPP Draft; R1-1612779, 3rd Generation Partnership Project (3GPP), Mobile Competence Centre; 650, Route Des Lucioles; F-06921 Sophia-Anti Polis Cedex; France, vol. RAN WG1, no. Reno, USA; Nov. 13, 2016, XP051176721, Retrieved from the Internet: URL:http://www.3gpp.org/ftp/Meetings_3GPP_SYNC/RAN1/Docs/ [retrieved on Nov. 13, 2016], 3 pages.

(Continued)

*Primary Examiner* — Christopher M Brandt
(74) *Attorney, Agent, or Firm* — Haynes and Boone, LLP

(57) ABSTRACT

Wireless communications systems and methods related to autonomous uplink transmission in a shared spectrum are provided. A first wireless communication device identifies a transmission opportunity (TXOP) in a shared spectrum shared by the plurality of network operating entities. The first wireless communication device is associated with a first network operating entity of the plurality of network operating entities. The first wireless communication device identifies a resource in the TXOP designated for autonomous communication. The first wireless communication device communicates autonomous data with a second wireless communication device associated with the first network operating entity during the TXOP using the resource.

30 Claims, 11 Drawing Sheets

(51) Int. Cl.
*H04W 16/14* (2009.01)
*H04W 72/10* (2009.01)

(56) References Cited

U.S. PATENT DOCUMENTS

| | | |
|---|---|---|
| 2016/0212625 A1 | 7/2016 | Damnjanovic et al. |
| 2016/0219441 A1 | 7/2016 | Park et al. |
| 2017/0033833 A1* | 2/2017 | Terry .................. H04B 1/7136 |
| 2017/0118725 A1* | 4/2017 | Chu .................... H04W 52/325 |
| 2017/0230970 A1* | 8/2017 | Kim .................. H04W 72/0446 |
| 2017/0290059 A1* | 10/2017 | Karaki .............. H04W 74/0816 |

OTHER PUBLICATIONS

International Search Report and Written Opinion—PCT/US2017/063321—ISA/EPO—dated Feb. 20, 2018.
Qualcomm Incorporated: "Advanced Frame Structure", 3GPP Draft; R1-1610132, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Oct. 1, 2016, XP051159935, Retrieved from the Internet: URL:http://www.3gpp.org/ftp/tsg_ran/WG1_RL1/TSGR1_86b/Docs [retrieved on Oct. 1, 2016], 9 pages.

* cited by examiner

AUTONOMOUS UPLINK (UL) TRANSMISSION IN NEW RADIO-SPECTRUM SHARING (NR-SS)

CROSS REFERENCE TO RELATED APPLICATIONS

The present application claims priority to and the benefit of the U.S. Provisional Patent Application No. 62/446,224, filed Jan. 13, 2017, which is hereby incorporated by reference in its entirety as if fully set forth below and for all applicable purposes.

TECHNICAL FIELD

This application relates to wireless communication systems, and more particularly to transmitting uplink (UL) autonomous data in a shared frequency spectrum shared by multiple network operating entities.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations (BSs), each simultaneously supporting communication for multiple communication devices, which may be otherwise known as user equipment (UE).

A wireless communications system may operate over a shared spectrum, meaning that the wireless communications system includes one or more frequency bands that may be shared by multiple network operating entities. The shared spectrum may include unlicensed spectrum and/or licensed spectrum. In some instances, multiple network operating entities may share their licensed spectrum with each other to better utilize the spectrum. In some other instances, multiple network operating entities may obtain a licensed spectrum together.

Use of the available band spectrum may then be subject to a contention procedure that may involve the use of a medium-sensing procedure. For example, to avoid interference between different devices or between devices operated by different network operating entities, the wireless communications system may employ medium-sensing procedures, such as listen-before-talk (LBT), to ensure a particular channel is clear before transmitting a message. Medium-sensing procedures may utilize substantial signaling overhead and may result in increased latency, thus adversely affecting the use of shared spectrum by multiple network operating entities.

One approach to reducing medium-sensing signaling overheads is to employ a priority-based coordinated access scheme for spectrum sharing. In a priority-based coordinated access scheme, a shared spectrum is partitioned into multiple time periods. Each time period is designated for a particular type of access. For example, a time period can be allocated to a particular network operator for exclusive access of the shared spectrum, where no reservation from the particular network operator is required. Alternatively, a time period can be shared among multiple network operators on a priority basis with reservations. For example, a high priority network operator may have priority or guaranteed access of the shared spectrum in a time period, but requires a prior reservation of the time period. When the high priority network operator does not reserve the time period, a low priority network operator can opportunistically access the shared spectrum in the time period.

Autonomous communications are typically timing critical and may have strict latency requirements. The time-division multiplexing (TDM) nature of the priority-based coordinated access scheme may not meet the latency requirement of time-critical traffic. Accordingly, improved procedures for spectrum sharing with autonomous communication support are desirable.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes identifying, by a first wireless communication device associated with a first network operating entity of a plurality of network operating entities, a transmission opportunity (TXOP) in a shared spectrum shared by the plurality of network operating entities; identifying, by the first wireless communication device, a resource in the TXOP designated for autonomous communication; and communicating, by the first wireless communication device with a second wireless communication device associated with the first network operating entity, autonomous data during the TXOP using the resource.

In an additional aspect of the disclosure, a method of wireless communication includes identifying, by a first wireless communication device associated with a first network operating entity of a plurality of network operating entities, a transmission opportunity (TXOP) in a shared spectrum shared by the plurality of network operating entities; and communicating, by the first wireless communication device, with a second wireless communication device associated with the first network operating entity, autonomous data in the TXOP without a prior reservation for the TXOP.

In an additional aspect of the disclosure, an apparatus includes a processor configured to identify a transmission opportunity (TXOP) in a shared spectrum shared by a plurality of network operating entities, wherein the apparatus is associated with a first network operating entity of the plurality of network operating entities; and identify a resource in the TXOP designated for autonomous communication; and a transceiver configured to communicate, with a second wireless communication device associated with the first network operating entity, autonomous data during the TXOP using the resource.

In an additional aspect of the disclosure, an apparatus includes a processor configured to identify a transmission opportunity (TXOP) in a shared spectrum shared by a plurality of network operating entities, wherein the apparatus is associated with a first network operating entity of the plurality of network operating entities; and a transceiver configured to communicate, with a second wireless communication device associated with the first network operating entity, autonomous data in the TXOP without a prior reservation for the TXOP.

In an additional aspect of the disclosure, a computer-readable medium having program code recorded thereon, the program code includes code for causing a first wireless communication device associated with a first network operating entity of a plurality of network operating entities to identify a transmission opportunity (TXOP) in a shared spectrum shared by the plurality of network operating entities; code for causing the first wireless communication device to identify a resource in the TXOP designated for autonomous communication; and code for causing the first wireless communication device to communicate with a second wireless communication device associated with the first network operating entity, autonomous data during the TXOP using the resource.

In an additional aspect of the disclosure, a computer-readable medium of wireless communication includes code for causing a first wireless communication device associated with a first network operating entity of a plurality of network operating entities to identify a transmission opportunity (TXOP) in a shared spectrum shared by the plurality of network operating entities; and code for causing the first wireless communication device to communicate, with a second wireless communication device associated with the first network operating entity, autonomous data in the TXOP without a prior reservation for the TXOP.

In an additional aspect of the disclosure, an apparatus includes means for identifying a transmission opportunity (TXOP) in a shared spectrum shared by a plurality of network operating entities, wherein the apparatus is associated with a first network operating entity of the plurality of network operating entities; and means for identifying a resource in the TXOP designated for autonomous communication; and means for communicating, with a second wireless communication device associated with the first network operating entity, autonomous data during the TXOP using the resource.

In an additional aspect of the disclosure, an apparatus includes means for identifying a transmission opportunity (TXOP) in a shared spectrum shared by a plurality of network operating entities, wherein the apparatus is associated with a first network operating entity of the plurality of network operating entities; and means for communicating, with a second wireless communication device associated with the first network operating entity, autonomous data in the TXOP without a prior reservation for the TXOP.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
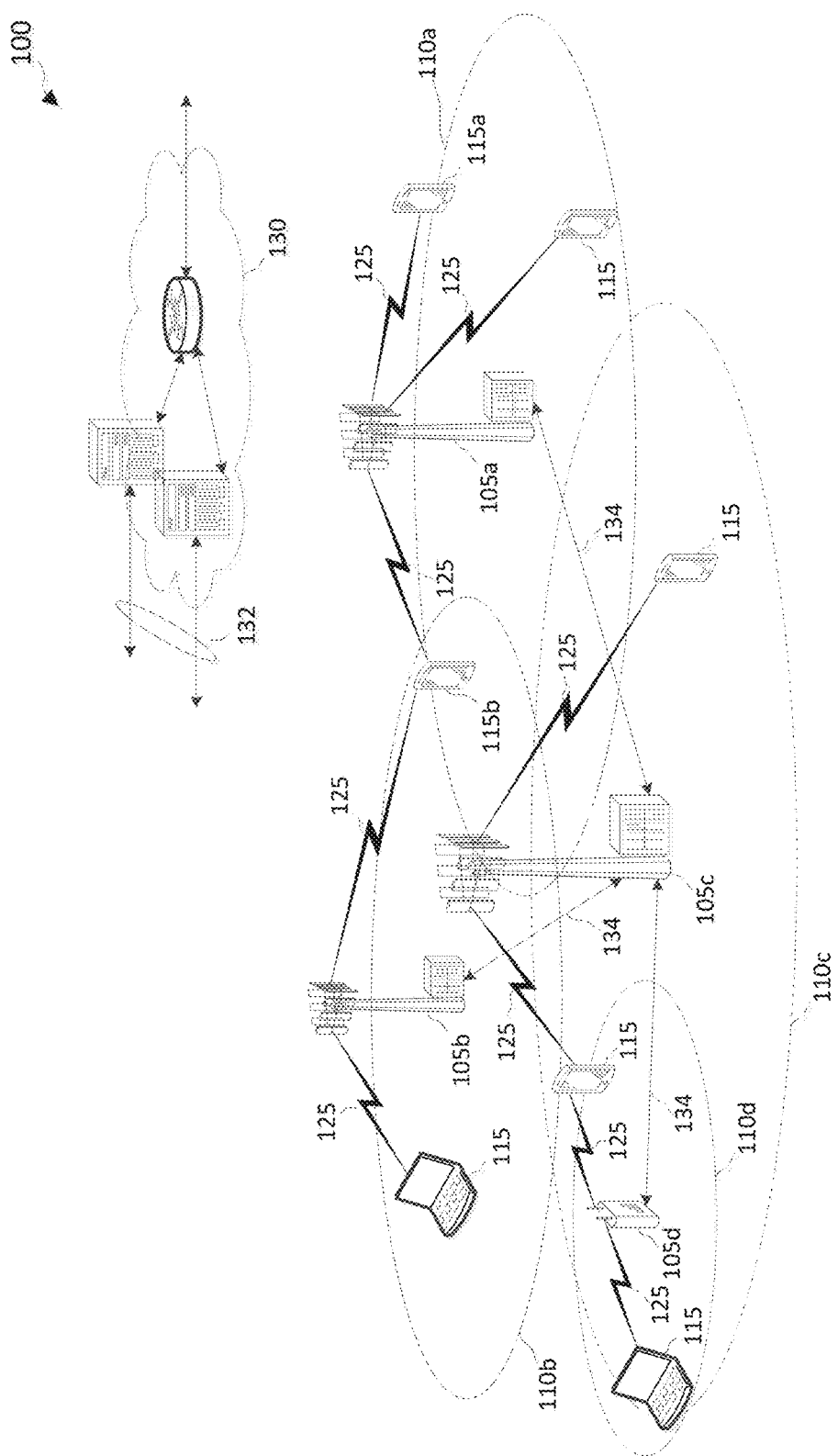
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., 5$^{th}$ Generation (5G) operating in mmWav bands) network.

One approach to supporting autonomous communication in a priority-based coordinated spectrum sharing scheme is to reserve a dedicated frequency band in a shared spectrum for each network operating entity to communicate autonomously (e.g., without a schedule). Some examples of autonomous communication may include ultra-reliability low latency communication (URLLC) traffic and physical random access channel (PRACH) transmissions. To meet the bandwidth requirements of PRACH transmissions, each dedicated frequency band is required to span a substantial amount of bandwidth (e.g., about 5 megahertz (MHz)). When multiple network operators are present, the frequency or bandwidth overhead of the dedicated frequency bands is significant. In addition, when a network operator has no autonomous transmission, the dedicated frequency band is unused and results in medium loss. Thus, the use of a dedicated frequency band per network operator is inefficient.

Another approach is to reserve a single dedicated frequency band in a shared spectrum for autonomous communications by all network operating entities. The network operating entities may opportunistically access the dedicated frequency band for autonomous communications based on reservations, for example, using request-to-send (RTS) and clear-to-send (CTS) signaling mechanisms. However, the reservation signaling overheads may be excessive when the autonomous communication carries URLLC data, which are typically small in size (e.g., a few bits or a few bytes).

The present disclosure describes uplink (UL) autonomous transmission mechanisms in a shared spectrum shared by multiple network operating entities. In a priority-based spectrum sharing scheme, a shared spectrum is time-partitioned into transmission opportunities (TXOPs). Each TXOP is designated for prioritized use by a prioritized or high priority network operating entity and opportunistic use by low priority network operating entities based on reservations. In one embodiment, a TXOP may include a dedicated resource for UL autonomous transmissions. The TXOPs may be configured with the dedicated resource based on a duty cycle. For example, the dedicated resource may be a dedicated frequency band in the shared spectrum, where dedicated frequency band is shared by the multiple network operating entities. Alternatively, the dedicate resource may be a time period within the TXOP, where the time period is assigned to a prioritized network operating entity of the TXOP. In another embodiment, a node of a particular network operating entity may transmit UL autonomous data in a TXOP concurrently with transmissions of another network operating entity that has reserved or gained access to the TXOP. The transmit power level of the UL autonomous data may controlled via interference management. In another embodiment, a network operating entity may reserve a TXOP for UL autonomous communication without knowing whether the TXOP is required.

The present disclosure may provide several benefits. For example, the allocation of dedicated resources in a TXOP for UL autonomous transmissions may reduce transmission latency of time-critical data. The use of a dedicated frequency band among the multiple network operating entities or a time portion of a TXOP for UL autonomous transmissions can improve resource utilization efficiency. The use of interference management to allow for simultaneous UL autonomous transmissions of one network operating entity and other transmissions of another network operating entity, and thus may reduce transmission latency of time-critical data. The additional reservations for UL autonomous communications can also improve transmission latency of time-critical data. The disclosed embodiments are suitable for use in coverage areas including macro cells and small cells. The disclosed embodiments are compatible with any wireless communication protocol.

FIG. 1 illustrates a wireless communication network 100 according to embodiments of the present disclosure. The network 100 includes BSs 105, UEs 115, and a core network 130. In some embodiments, the network 100 operates over a shared spectrum. The shared spectrum may be unlicensed or partially licensed to one or more network operators. Access to the spectrum may be limited and may be controlled by a separate coordination entity. In some embodiments, the network 100 may be a LTE or LTE-A network. In yet other embodiments, the network 100 may be a millimeter wave (mmW) network, a new radio (NR) network, a 5G network, or any other successor network to LTE. The network 100 may be operated by more than one network operator. Wireless resources may be partitioned and arbitrated among the different network operators for coordinated communication between the network operators over the network 100.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with the core network 130 and with one another. The core network 130 may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links 132 (e.g., S1, S2, etc.) and may perform radio configuration and scheduling for communication with the UEs 115. In various examples, the BSs 105 may communicate, either directly or indirectly (e.g., through core network 130), with each other over backhaul links 134 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into sub-bands.

In an embodiment, the BSs 105 can assign or schedule transmission resources (e.g., in the form of time-frequency resource blocks) for DL and UL transmissions in the network 100. The communication can be in the form of radio frames. A radio frame may be divided into a plurality of subframes, for example, about 10. Each subframe can be divided into slots, for example, about 2. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are pre-determined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell-specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than UL communication.

In an embodiment, a UE 115 attempting to access the network 100 may perform an initial cell search by detecting a primary synchronization signal (PSS) from a BS 105. The PSS may enable synchronization of period timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105. After establishing the connection, the UE 115 and the BS 105 can enter a normal operation stage, where operational data may be exchanged.

In some embodiments, the UEs 115 and the BSs 105 may be operated by multiple network operators or network operating entities and may operate in a shared radio frequency spectrum, which may include licensed or unlicensed frequency bands. The shared spectrum may be time-partitioned for sharing among the multiple network operating entities to facilitate coordinated communication. For example, in the network 100, the BS 105a and the UE 115a may be associated with one network operating entity, while the BS 105b and the UE 115b may be associated with another network operating entity. By time-partitioning the shared spectrum according to network operating entities, the communications between the BS 105a and the UE 115a and the communications between the BS 105b and the UE 115b may each occur during respective time periods and may avail themselves of an entirety of a designated shared spectrum. In addition, certain time periods may be allocated for certain types of communication or access over the shared spectrum. Further, certain resources may be allocated for autonomous transmissions or override for autonomous transmissions to meet latency requirements of time-critical data (e.g., physical random access channel (PRACH) preambles or scheduling requests (SRs)), as described in greater detail herein.

To support coordinated access of the shared spectrum, a BS 105 or an entity of the core network 130 may act as a central arbitrator to manage access and coordinate the partitioning of resources among different network operating entities operating within the network 100. In some embodiments, the central arbitrator may include a spectrum access system (SAS). In addition, the transmissions from the multiple network operating entities can be time synchronized to facilitate the coordination.

Figure 2:
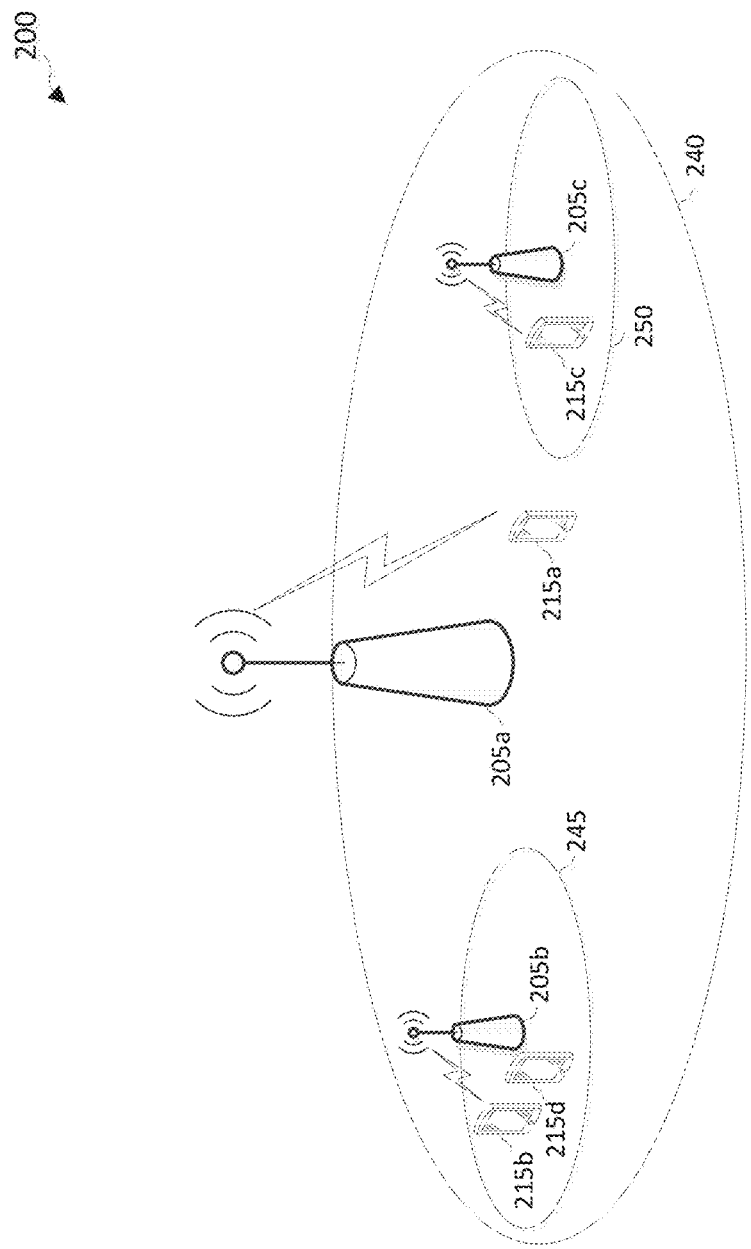
FIG. 2 illustrates an example of a wireless communications network that supports priority-based spectrum sharing according to embodiments of the present disclosure.

FIG. 2 illustrates an example of a wireless communications network 200 that supports priority-based spectrum sharing according to embodiments of the present disclosure. The network 200 may be similar to the network 100. FIG. 2 illustrates three BSs 205 and four UEs 215 for purposes of simplicity of discussion, though it will be recognized that embodiments of the present disclosure may scale to many more UEs 215 and/or BSs 205. The BSs 205 and the UEs 215 may be similar to the BSs 105 and the UEs 115, respectively. The BS 205a serves the UE 215a in a macro cell 240. The BS 205b serves the UEs 215b and 215d in a pico cell 245 within a coverage area of the macro cell 240. The BSs 205c serves the UE 215c in another pico cell 250 within the coverage area of the macro cell 240. The BSs 205 and the UEs 215 may communicate over the same spectrum.

Due to the different transmission power requirements or power-classes of nodes (e.g., the BSs 205 and the UEs 215) in the macro cell 240 and the pico cells 245 and 250, different power-class nodes may be treated as different network operating entities and assigned with different priorities for sharing the spectrum to minimize interference. For example, the BS 205a and the UE 215a may be treated as one network operating entity (e.g., Operator A), the BS 205b and 205c and the UEs 215b-d may be treated as another network operating entity (e.g., Operator B). In the present disclosure, the terms network operating entity and operator may be used interchangeably and may be associated with a particular priority and/or a particular power class.

The spectrum may be partitioned by classifying time resources into periods and assigning the periods to different network operating entities. In some embodiments, certain time periods may be allocated for exclusive use by a particular network operating entity. Other time periods may be allocated for prioritized use or guaranteed use by a particular network operating entity, but may also be for opportunistic use by the other network operating entities. In yet other examples, certain time periods may be designated for opportunistic use by all network operating entities, for example, to enable additions of network operating entities into the network 200 in a non-centralized manner. The claiming of the time periods for prioritized use or opportunistic use may be based on reservations. In addition, certain resources may be allocated for autonomous communications by all network operating entities or a particular network operating entities. Further, autonomous communications of one network operating entity can simultaneously occur with other communications of another network operating entity by managing interference. The autonomous communication mechanisms are described in greater detail herein.

Figure 3:
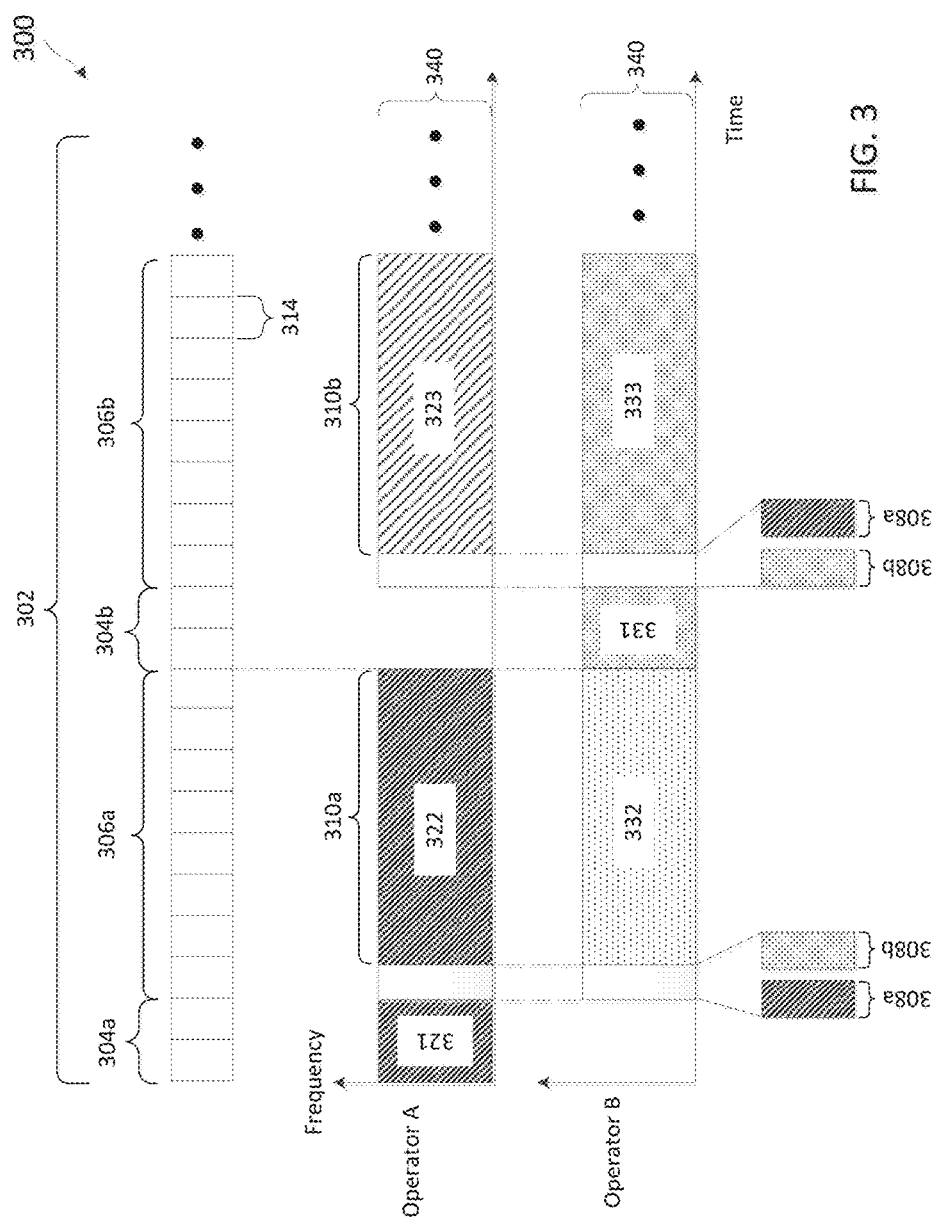
FIG. 3 illustrates a priority-based spectrum sharing scheme according to embodiments of the present disclosure.

FIG. 3 illustrates a priority-based spectrum sharing scheme 300 according to embodiments of the present disclosure. The x-axis represents time in some constant units. The y-axis represents frequency in some constant units. The scheme 300 may be employed by the BSs 105 and 205 and the UEs 115 and 215. While the scheme 300 illustrates coordinated spectrum access for two different network operating entities (e.g., Operator A and Operator B), the scheme 300 can be applied to any suitable number of network operating entities.

In the scheme 300, a shared spectrum over a frequency band 340 is time-partitioned into superframes 302. Each superframe 302 is partitioned into exclusive access periods 304 and TXOPs 306. Each TXOP 306 includes a plurality of channel sensing or clear channel assessment (CCA) periods 308 at the beginning of the TXOP 306, followed by a transmission period 310. The exclusive access periods 304, the CCA periods 308, and the transmission period 310 may have fixed durations. For example, each exclusive access period 304 may include one or more subframes, each CCA period 308 may include one or more OFDM symbols, and each transmission period 10 may include one or more subframes. In some embodiments, a superframe 302 may correspond to one radio frame (e.g., about 10 milliseconds (ms) long), each TXOP 306 may have a granularity of a slot 314 (e.g., about 500 microseconds (μs) long), and each exclusive access period 304 may span about 2 slots 314 (e.g., 1 ms long). The structure of the superframe 302 is pre-determined and known by all network operating entities sharing the shared spectrum. The network operating entities may be time-synchronized when operating in the shared spectrum.

Each exclusive access period 304 is designated for exclusive use by a particular network operating entity. For example, the exclusive access period 304a is designated for exclusive communication 321 by Operator A. Operator B is not allowed to transmit during the exclusive access period 304a. Similarly, the exclusive access period 304b is designated for exclusive communication 331 by Operator B and Operator A is not allowed to transmit during the exclusive access period 304b. In an embodiment, the exclusive access period 304 can be used for acquisition and signaling of PSS, SSS, PBCH, SIB, paging, RACH, and/or time-critical data. In some other embodiments, an exclusive access period 304 may divided into multiple regions, each designated for exclusive use by a particular network operating entity, for example, via time-division multiplexing (TDM) or frequency-division multiplexing (FDM).

Each CCA period 308 in a TXOP 306 is assigned to a particular network operating entity. For example, the CCA periods 308a and 308b are assigned to Operators A and B, respectively. The number of CCA periods 308 in a TXOP 306 may be dependent on the number of network operating entities in a network. For example, a network with N network operators may include up to N CCA periods 308 in a TXOP 306. The CCA periods 308 can be arranged in a TXOP 306 based on communication or access priorities of the network operating entities, for example, in a descending order. Thus, each TXOP 306 is prioritized for use by a highest priority network operating entity, and may be utilized by lower priority network operating entities on an opportunistic basis if the prioritized network operating entity does not utilize the resources. In addition, the priorities of the network operating entities may rotate (e.g., in a round-robin fashion) among the TXOPs 306 within a superframe 302.

As shown, the TXOP 306a is designated for prioritized communications 322 by Operator A and opportunistic communications 332 by Operator B. The TXOP 306b is designated for prioritized communication 333 by Operator B and opportunistic communications 323 by Operator A. Prioritized communication refers to the use of guaranteed resources, whereas opportunistic communication refers to opportunistic use of resources not reserved by high priority operator.

As an example, an Operator A node (e.g., the BS 205a) may transmit a reservation request (RRQ) signal in the CCA period 308a of the TXOP 306a to reserve the following transmission period 310a and communicate with another Operator A node (e.g., the UE 215a) in the transmission period 310a. The RRQ signal may include a pre-determined preamble sequence or a RTS signal. In some embodiments, a target receiving node may respond to the RRQ signal by sending a reservation response (RRS) signal or a CTS signal. In some embodiments, the RRQ signal may include a schedule (e.g., a DL trigger and/or a UL grant) for the transmission period 310a. The schedule may be referred to as a regular schedule. Operator B nodes (e.g., the BS 205b and the UE 215b) may listen to the channel during the CCA period 308a. Upon detection of a RRQ signal and/or RRS signal from the Operator A node, the Operator B nodes may refrain from using the transmission period 310a. However, when no reservation is detected in the CCA period 308a, an Operator B node (e.g., the BS 205b) may opportunistically use the transmission period 310a by transmitting a reservation in the CCA period 308b of the TXOP 306a and communicate with another Operator B node (e.g., the UE 215b) in the transmission period 310a. The communication in the transmission period 310 may be referred to as regular communication.

Figure 4:
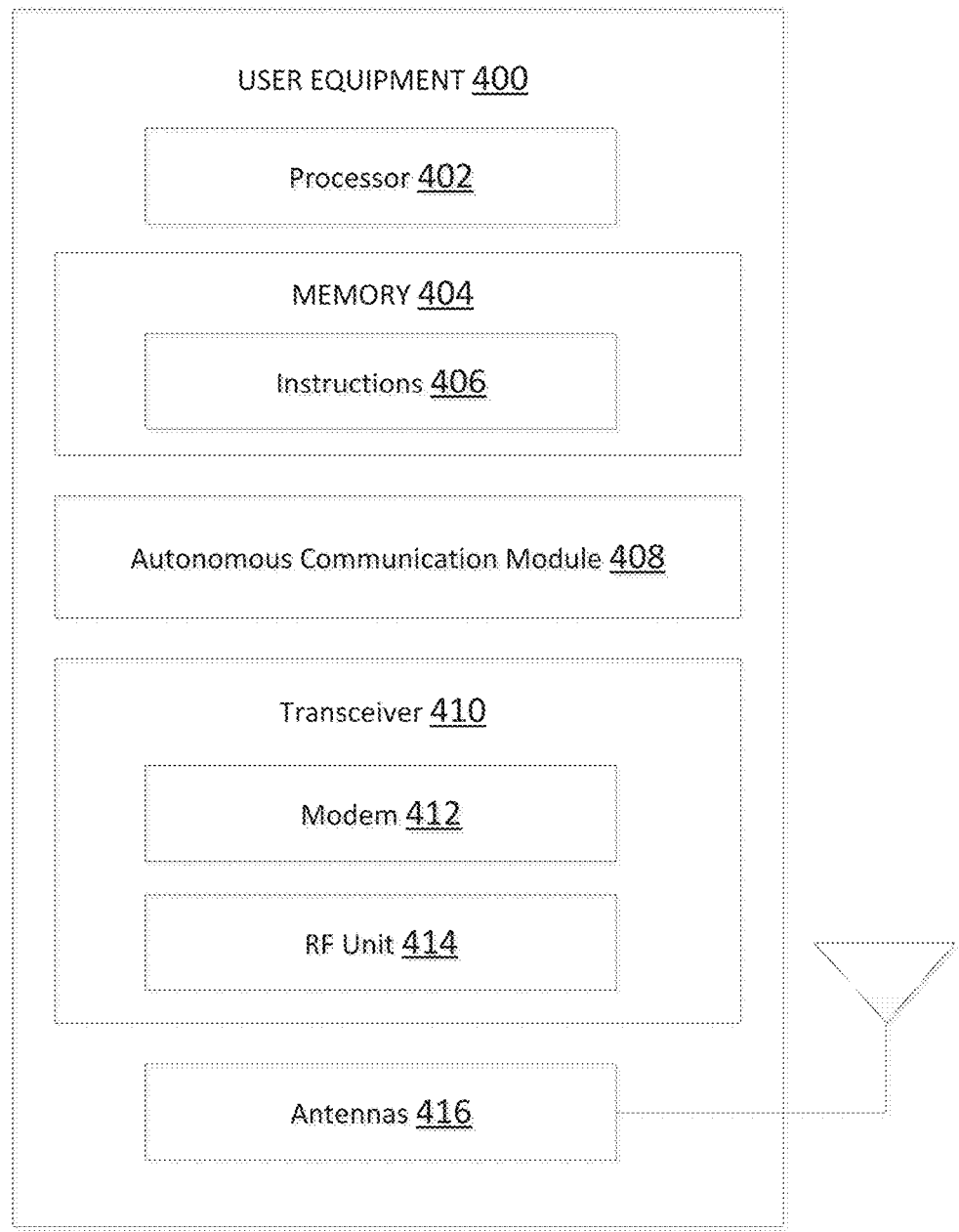
FIG. 4 is a block diagram of an exemplary user equipment (UE) according to embodiments of the present disclosure.

FIG. 4 is a block diagram of an exemplary UE 400 according to embodiments of the present disclosure. The UE 400 may be a UE 115 or 215 as discussed above. As shown, the UE 400 may include a processor 402, a memory 404, an autonomous communication module 408, a transceiver 410 including a modem subsystem 412 and a radio frequency (RF) unit 414, and an antenna 416. These elements may be in direct or indirect communication with each other, for example via one or more buses.

The processor 402 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store instructions 406. The instructions 406 may include instructions that, when executed by the processor 402, cause the processor 402 to perform the operations described herein with reference to the UEs 215 in connection with embodiments of the present disclosure. Instructions 406 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The autonomous communication module 408 may be used for various aspects of the present disclosure. For example, the autonomous communication module 408 is configured to identify TXOPs in a shared spectrum, identify autonomous transmission resources in the TXOPs, perform network listening, reserve time periods for regular communication and/or autonomous communication over the shared spectrum, and/or manage interference from autonomous transmission, as described in greater detail herein.

As shown, the transceiver 410 may include the modem subsystem 412 and the RF unit 414. The transceiver 410 can be configured to communicate bi-directionally with other devices, such as the BSs 105 and 205. The modem subsystem 412 may be configured to modulate and/or encode the data from the memory 404 and/or the autonomous communication module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 215 or a BS 205. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 215 to enable the UE 215 to communicate with other devices.

The RF unit 414 may provide the modulated and/or processed data, e.g. data packets (or, more generally, data messages that may contain one or more data packets and other information), to the antenna 416 for transmission to one or more other devices. This may include, for example, transmission of clear-to-send (CTS) signals according to embodiments of the present disclosure. The antenna 416 may further receive data messages transmitted from other devices. This may include, for example, reception of request-to-send (RTS) and/or CTS signals according to embodiments of the present disclosure. The antenna 416 may provide the received data messages for processing and/or demodulation at the transceiver 410. Although FIG. 4 illustrates antenna 416 as a single antenna, antenna 416 may include multiple antennas of similar or different designs in order to sustain multiple transmission links. The RF unit 414 may configure the antenna 416.

Figure 5:
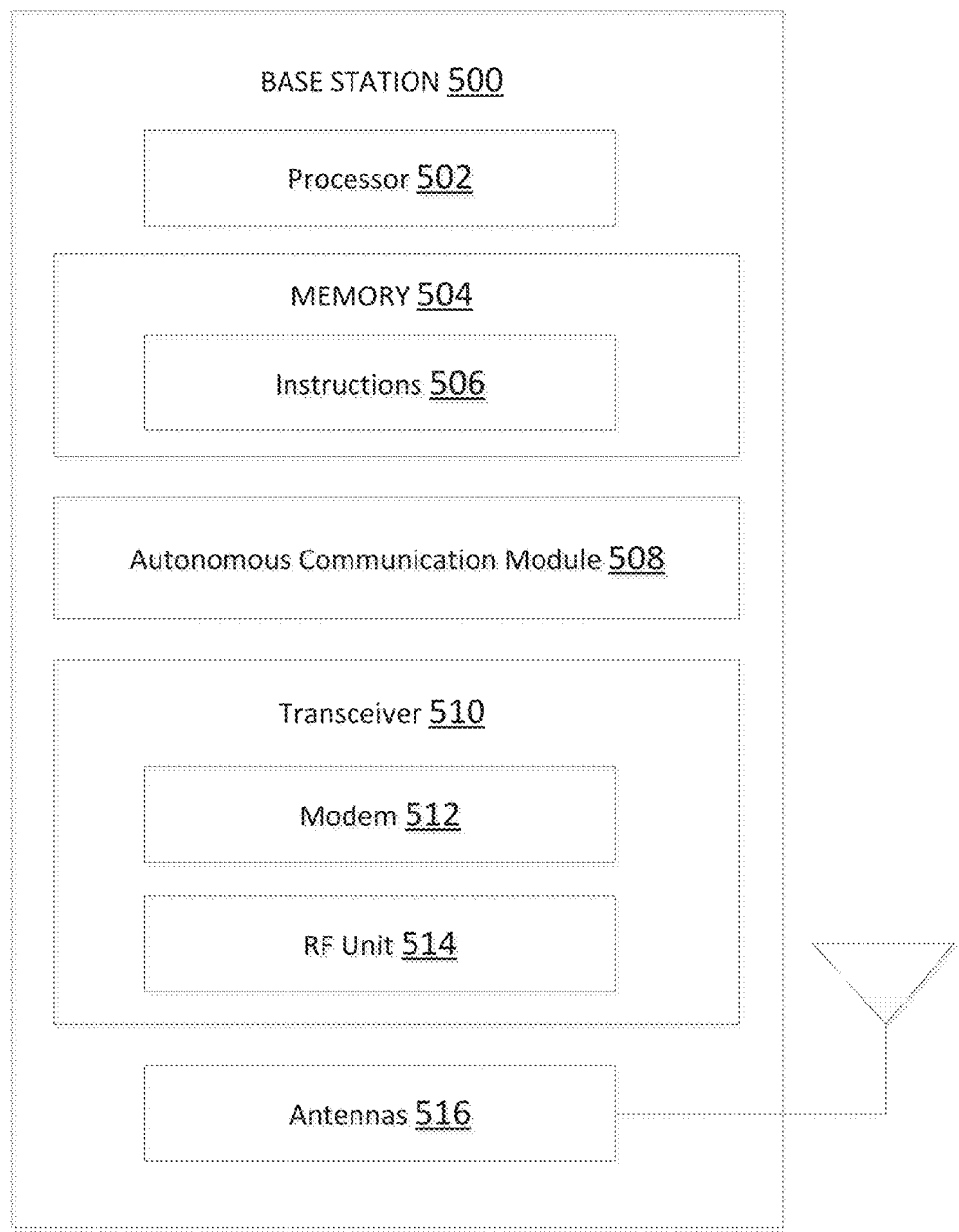
FIG. 5 is a block diagram of an exemplary base station (BS) according to embodiments of the present disclosure.

FIG. 5 is a block diagram of an exemplary BS 500 according to embodiments of the present disclosure. The BS 500 may be a BS 105 or 205 as discussed above. A shown, the BS 500 may include a processor 502, a memory 504, an autonomous communication module 508, a transceiver 510 including a modem subsystem 512 and a RF unit 514, and an antenna 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein. Instructions 506 may also be referred to as code, which may be interpreted broadly to include any type of computer-readable statement(s) as discussed above with respect to FIG. 5.

The autonomous communication module 508 may be used for various aspects of the present disclosure. For example, the autonomous communication module 508 is configured to identify TXOPs in a shared spectrum, identify autonomous transmission frequency bands in the TXOPs, perform network listening, reserve time periods for regular communication and/or autonomous communication over the shared spectrum, as described in greater detail herein.

As shown, the transceiver 510 may include the modem subsystem 512 and the RF unit 514. The transceiver 510 can be configured to communicate bi-directionally with other devices, such as the UEs 115 and 215 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 215. The RF unit 514 may be further configured to perform analog beamforming in conjunction with the digital beamforming. Although shown as integrated together in transceiver 510, the modem subsystem 512 and the RF unit 514 may be separate devices that are coupled together at the BS 205 to enable the BS 205 to communicate with other devices.

The RF unit 514 may provide the modulated and/or processed data, e.g. data packets (or, more generally, data messages that may contain one or more data packets and other information), to the antenna 516 for transmission to one or more other devices. This may include, for example, transmission of information to complete attachment to a network and communication with a camped UE 215 according to embodiments of the present disclosure. The antenna 516 may further receive data messages transmitted from other devices and provide the received data messages for processing and/or demodulation at the transceiver 510. Although FIG. 5 illustrates antenna 516 as a single antenna, antenna 516 may include multiple antennas of similar or different designs in order to sustain multiple transmission links.

Figure 6:
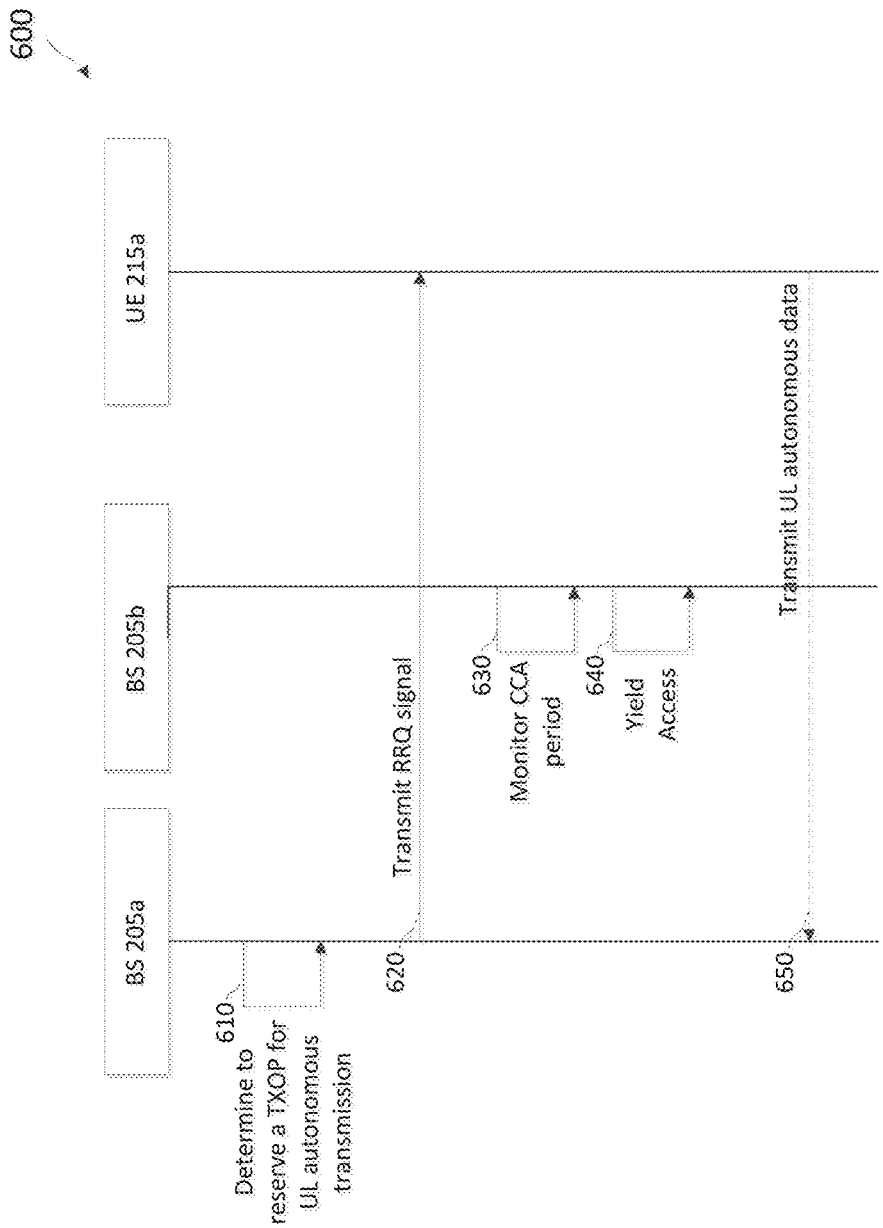
FIG. 6 illustrates an uplink (UL) autonomous transmission scheme according to embodiments of the present disclosure.
Figure 7:
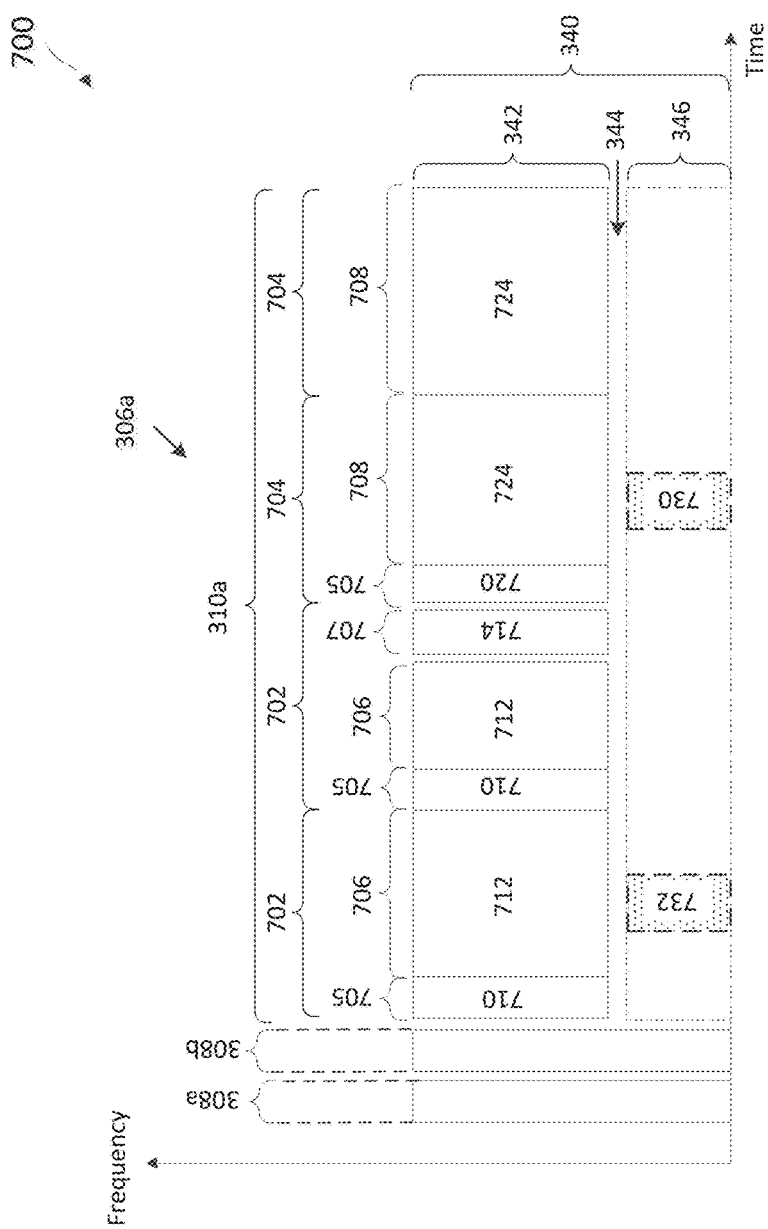
FIG. 7 illustrates a UL autonomous transmission scheme according to embodiments of the present disclosure.
Figure 8:
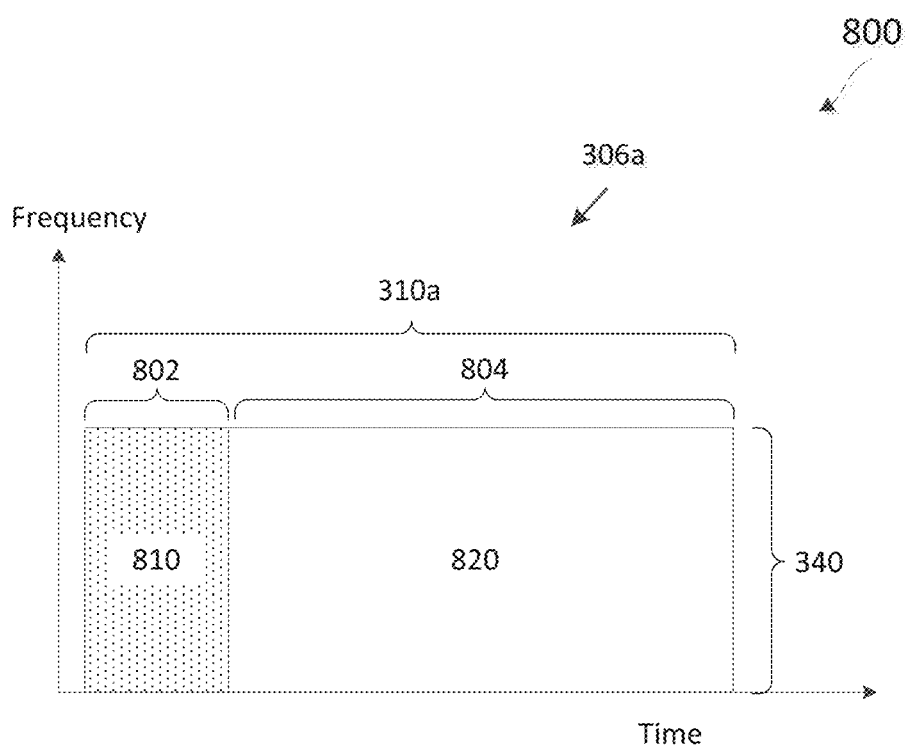
FIG. 8 illustrates a UL autonomous transmission scheme according to embodiments of the present disclosure.
Figure 9:
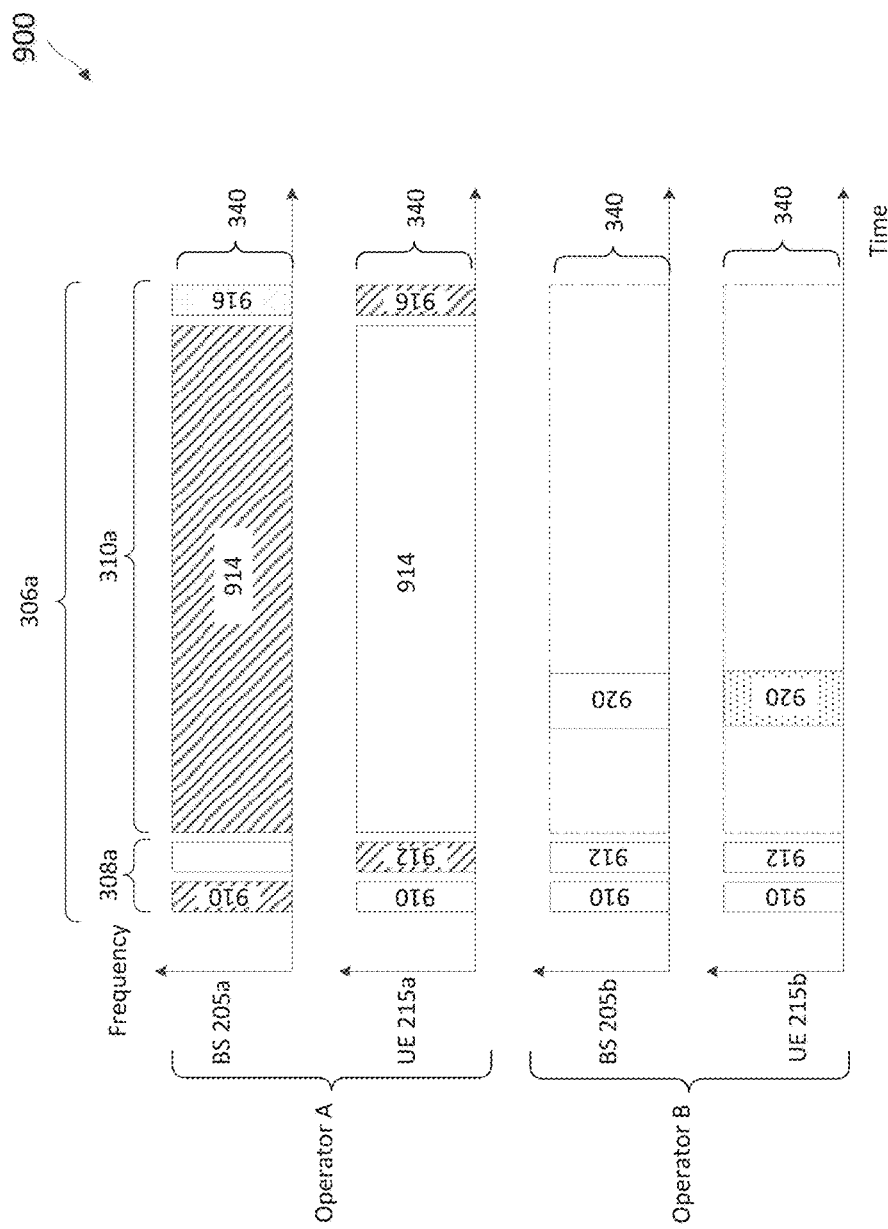
FIG. 9 illustrates a UL autonomous transmission scheme according to embodiments of the present disclosure.

FIGS. 6-9 illustrate various UL autonomous data transmission mechanisms based on the superframe 302 structure of the scheme 300 and may be employed by the BSs 105 and 205 and the UEs 115 and 215. While FIGS. 6-9 illustrate UL autonomous communications by two operators (e.g., Operator A and Operator B), for purposes of simplicity of discussion, though it will be recognized that embodiments of the present disclosure may scale to many more UEs 215 and/or BSs 205. In FIGS. 7-9, the x-axes represent time in some constant units, and the y-axes represent frequency in some constant units.

FIG. 6 illustrates a UL autonomous transmission scheme 600 according to embodiments of the present disclosure. In the scheme 600, a network operating entity (e.g., the BSs 105 and 205) may reserve some TXOPs 306 (e.g., based on a certain duty cycle) for UL autonomous transmissions regardless of whether any UEs (e.g., the UEs 115 and 215) may have UL autonomous data for transmission. As an example, Operator A has priority over Operator B in the TXOP 306a. At step 610, the BS 205a may determine to reserve the TXOP 306a for UL autonomous transmission, for example, based on a pre-determined duty cycle. At step 620, the BS 205a may transmit a RRQ and/or RRS signal in the CCA period 308a of the TXOP 306a to reserve the TXOP 306a. At step 630, the BS 205b may monitor the CCA period 308a. At step 640, upon detection of the RRQ and/or RRS signal from the BS 205a, the BS 205b may yield access to the high priority BS 205a and refrain from using the TOXP 306a. At step 650, if the UE 215a has UL autonomous data for transmission, the UE 215a may transmit the UL autonomous data to the BS 205a during the reserved TXOP 306a. However, if the UE 215b has no UL autonomous data ready for transmission, the TXOP 306a may be left unused.

By reserving TXOPs 306 for UL autonomous communications, the scheme 600 provides additional transmission opportunities for RACH data, URLLC data, and/or time-critical data instead of limiting autonomous transmissions in the assigned exclusive access periods 304. Thus, the scheme 600 may meet the latency requirements for the autonomous transmissions. However, the TXOPs 306 are reserved without prior knowledge of whether there is UL autonomous data from the UEs. Thus, the scheme 600 may reserve more TXOPs 306 than required. In addition, when there is no UL autonomous data in a reserved TXOP 306, the reservation of the TXOP 306 prevents other network operating entities (e.g., Operator B) with data for transmissions from using the medium during the reserved TXOP 306. Thus, the scheme 600 may be inefficient in resource utilization.

FIG. 7 illustrates a UL autonomous data transmission scheme 700 according to embodiments of the present disclosure. The scheme 700 allocates or configures a fraction of frequency resources in a shared spectrum based on a duty cycle (e.g., at every 5 ms) for all network operating entities to transmit UL autonomous data. For example, in some TXOPs 306, the frequency band 340 of the shared spectrum is divided into two frequency bands 342 and 346. The frequency bands 342 and 346 may be separated by a guard band 344 to mitigate adjacent band interference. The configuration of the frequency bands 342 and 346 are known to all network operating entities. The frequency band 342 may be shared by multiple network operating entities for regular communications based on priorities and reservations as described in the scheme 300. For example, Operator A may have prioritized access for regular communication over the frequency band 342 in the TXOP 306a, while Operator B may have opportunistic access for regular communication over the frequency band 342 in the TXOP 306a.

The frequency band 346 is a dedicated frequency band designated for UL autonomous data transmissions by all network operating entities. The frequency band 346 may occupy a fraction of the frequency band 340. In an embodiment, the frequency band 346 may span a bandwidth (e.g., about 5 MHz) sufficient for PRACH transmissions. The network operating entities may contend for a resource in the frequency band 346 for transmitting UL autonomous data. In an embodiment, the UL autonomous data are PRACH preambles, where different network operating entities can be differentiated by using different PRACH preamble sequences. It should be noted that the CCA periods 308 span the entire frequency band 340. Thus, the UL autonomous communications can occur during the transmission period 310, and not during the CCA periods 308.

As an example, the BS 205a (e.g., Operator A) has gained access to the TXOP 306a by employing the reservation mechanisms described in the scheme 300 and uses the TXOP 306a for both DL and UL communications. The transmission period 310a is divided into a plurality of consecutive DL subframes 702 followed by a plurality of UL consecutive subframes 704 in the shared frequency band 342. Each DL subframe 702 or UL subframe 704 may have a granularity of a slot 314. Each DL subframe 702 may include a DL control portion 705 and a DL data portion 706. The last DL subframe 702 may further include a UL control portion 707. The first UL subframe 704 may include a DL control portion 705 and a UL data portion 708. Subsequent UL subframes may include UL data portions 708.

In each DL subframe 702, the BS 205a may transmit a DL control 710 in the DL control portion 705 and DL data 712 in the DL data portions 706. The DL control 710 may indicate DL resource allocations or scheduling information for the following DL data portion 706. The DL data 712 may be transmitted according to the DL resource allocations. The DL data 712 may be referred to as scheduled or regular DL data, which may not be time-critical. In the last DL subframe 702, the UE 215a may transmit a UL control 714 in the UL control portion 707. The UL control 714 may indicate a scheduling request (SR), hybrid automatic repeat request (HARQ) information, and/or channel quality indicator (CQI) information.

In the first UL subframe 704, the BS 205a may transmit a DL control 720 in the DL control portion 705 to indicate UL resource allocations or scheduling information in the following UL data portions 708 or UL subframes 704. For example, the BS 205a may schedule the UE 215a to transmit in the following UL data portions 708. Thus, the UE 215a may transmit UL data 724 in the UL data portions 708 based on the schedule. The UL data 724 may be referred to as scheduled or regular UL data, which may not be time-critical.

In the transmission period 310a, a UE may contend to transmit UL autonomous data in the frequency band 346 when a serving BS is not in active transmission. A UE may determine whether a serving BS is active or has gained access to a particular TOXP 306 by monitoring the channel (e.g., the shared spectrum) in the CCA periods 308. When the serving BS has access in the particular TXOP 306, the UE may detect CRS and DL control information to determine the format of the transmission period 310 (e.g., the locations of the DL subframes 702 and the UL subframes 704). For example, the UE 215a or another UE served by the BS 205a may monitor the CCA period 308a and determine that the BS 205a is active during the transmission period 310a. Thus, the UE 215a or the another UE may contend to transmit UL autonomous data 730 in the frequency band 346 any time during the UL subframes 704.

When a UE determines that a serving BS is inactive during a particular TXOP 306, the UE may contend to transmit UL autonomous data in the frequency band 346 at any time during the transmission period 310 of the particular TXOP 306. For example, the UE 215b or another UE served by the BS 205b may monitor the CCA periods 308 and determine that the BS 205b is not active in the TXOP 306a. Thus, the UE 215b or the another UE may contend to transmit UL autonomous data 732 in the frequency band 346 any time during the transmission period 310a. As shown, the UL autonomous data 732 is transmitted during a DL subframe 702.

FIG. 8 illustrates a UL autonomous data transmission scheme 800 according to embodiments of the present disclosure. The scheme 800 allocates or configures a portion of resources at the beginning of some TXOPs 306 based on a duty cycle for a corresponding prioritized network operating entity to transmit UL autonomous data. For example, the transmission period 310 of a TXOP 306 may be divided into two portions 802 and 804. The portion 802 at the beginning of the transmission period 310 is designated for UL autonomous transmission by a corresponding prioritized network operating entity without a prior reservation. The portion 804 may be shared by multiple network operating entities for regular communications based on priorities and reservations as described in the scheme 300. For example, Operator A has priority over Operator B in the TXOP 306a. Thus, the portion 802 may be used by Operator A node (e.g., the UE 215a) to transmit UL autonomous data. In the portion 804, Operator A may have prioritized access for regular communication, while Operator B may have opportunistic access for regular communication.

As an example, the UE 215a may transmit UL autonomous data (e.g., a PRACH preamble) 810 during the portion 802 regardless of whether the BS 205a has reserved the TXOP 306a. If the BS 205a did not reserve the TXOP 306a, the BS 205b may opportunistically reserve the TXOP 306a for regular communications. However, the BS 205b needs to vacate the portion 802 for UL autonomous communication by Operator A. As shown, the BS 205b communicates regular or scheduled data 820 with the UE 215b in the portion 804.

FIG. 9 illustrates a UL autonomous data transmission scheme 900 according to embodiments of the present disclosure. The scheme 900 allows a network operating entity to transmit UL autonomous data in a TXOP 306 regardless of whether the TXOP 306 is reserved by another network operating entity for communications. The scheme 900 manages interference such that the UL autonomous data transmission may cause little or no interference to the regular communications. In FIG. 9, the patterned boxes represent transmit signals and the empty boxes represent receive signals. The dashed boxes are included as references to the structure of the TXOP 306 frame structure without signal transmission or reception. As an example, Operator A has priority over Operator B in the TXOP 306a. The BS 205a may transmit a RRQ signal 910 in the CCA period 308a to reserve the transmission period 310a for DL communication with the UE 215a. The UE 215a may detect the RRQ signal 910 and respond with a RRS signal 912. When the BS 205a expects to receive a UL transmission, the BS 205a may also send a RRS signal. Subsequently, the BS 205*a* and the UE 215*a* may proceed with regular communications in the transmission period 310*a*. For example, the BS 205*a* and the UE 215*a* may communicate a DL signal 914 (e.g., the DL control signals 710 and the DL data signals 712) and a UL signal 916 (e.g., the UL control signal 714) in the transmission period 310*a*.

In one embodiment, the UE 215*b* may listen to the medium (e.g., the shared spectrum) during the CCA periods 308 and may detect the RRQ signal 910 and/or the RRS signal 912 from Operator A. When the UE 215*b* has UL autonomous data (e.g., a PRACH preamble) 920 for transmission, the UE 215*b* may transmit the UL autonomous data 920 in the transmission period 310*a* while the BS 205*a* exchanges regular communications with the UE 215*a* and rely on interference cancellation of Operator A to cancel interference caused by the transmission of the UL autonomous data 920.

In another embodiment, the UE 215*b* may determine a maximum allowable transmit power level for the UL autonomous transmission based on the received signal power of the RRQ signal 910 and/or RRS signal 912. The UE 215*b* may transmit UL autonomous data 920 at a lower power level (e.g., according to the determined maximum allowable transmit power level) to reduce or minimize interference to the regular communications of Operator A. The BS 205*a* may receive and decode the UL autonomous data 920. It should be noted that a PRACH preamble can be detected at a substantially low power level.

Figure 10:
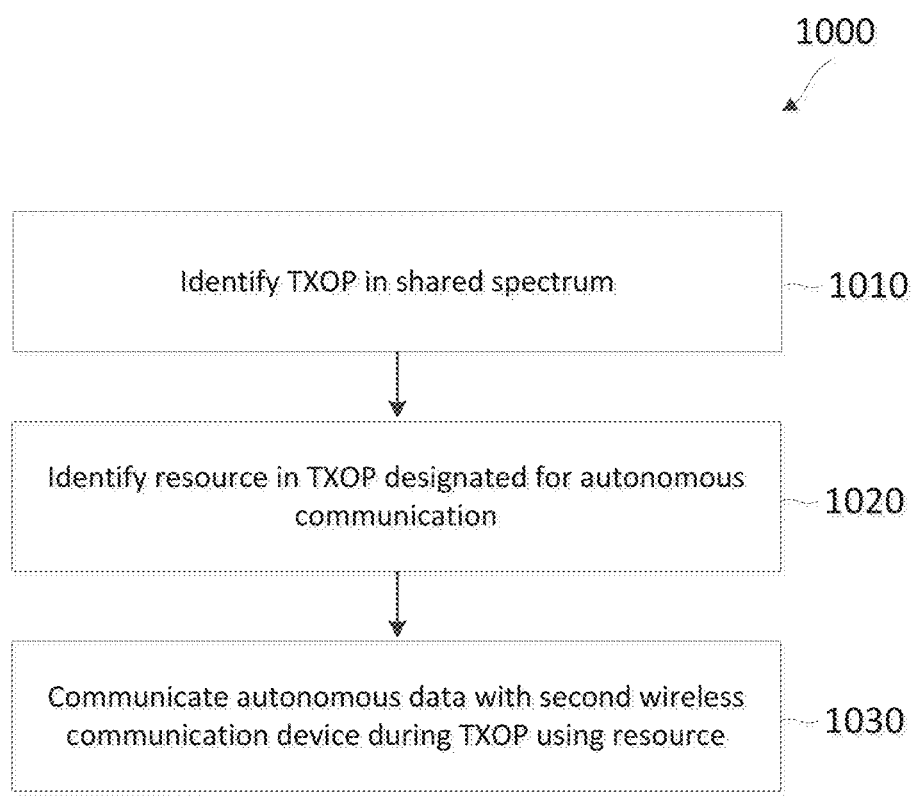
FIG. 10 is a flow diagram of a method of UL autonomous communication over a shared spectrum according to embodiments of the present disclosure.

FIG. 10 is a flow diagram of a method 1000 for autonomous communication over a shared spectrum according to embodiments of the present disclosure. Steps of the method 1000 can be executed by a computing device (e.g., a processor, processing circuit, and/or other suitable component) of a wireless communication device, such as the BSs 105, 205, and 500 and the UEs 115, 215, and 400. The method 1000 may employ similar mechanisms as in the schemes 300, 700, and 800 described with respect to FIGS. 3, 7, and 8, respectively. As illustrated, the method 1000 includes a number of enumerated steps, but embodiments of the method 1000 may include additional steps before, after, and in between the enumerated steps. In some embodiments, one or more of the enumerated steps may be omitted or performed in a different order.

At step 1010, the method 1000 includes identifying a TXOP (e.g., the TXOP 306) in a shared spectrum (e.g., over the frequency band 340) shared by the plurality of network operating entities (e.g., Operator A and Operator B). For example, the wireless communication device (e.g., the BS 205*a* or the UE 215*a*) is associated with a first network operating entity (e.g., Operator A) of the plurality of the network operating entities.

At step 1020, the method 1000 includes identifying a resource (e.g., the dedicated frequency band 346 of the scheme 700 or the portion 802 of the scheme 800) in the TXOP designated for autonomous communication.

At step 1030, the method 1000 includes communicating autonomous data (e.g., the autonomous data 730, 732, 810, and 920) with a second wireless communication device (e.g., the UE 215*a* or the BS 205*a*) associated with the first network operating entity during the TXOP. The autonomous data may include UL URLLC data, SR, or a PRACH preamble) and may be communicated based on the schemes 300, 700 and/or 800.

Figure 11:
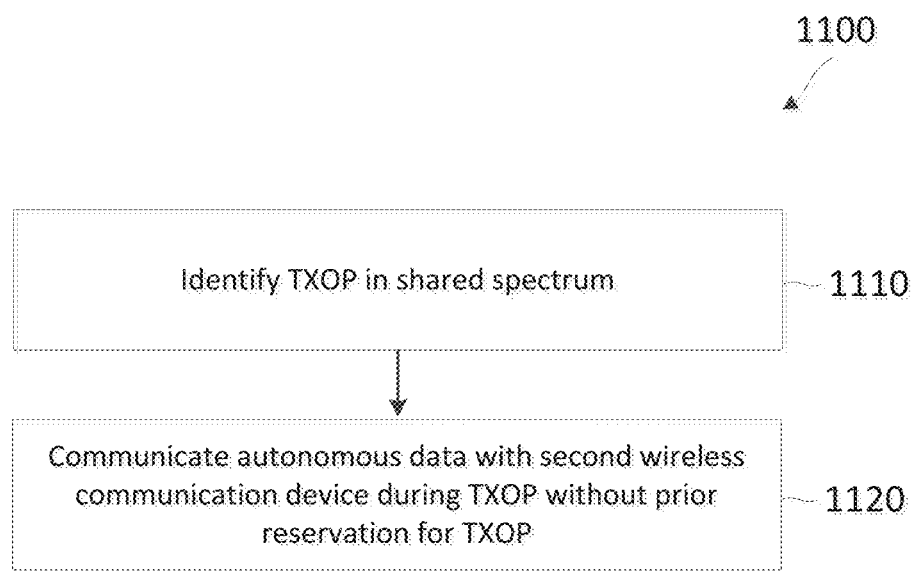
FIG. 11 is a flow diagram of a method of UL autonomous communication over a shared spectrum according to embodiments of the present disclosure.

FIG. 11 is a flow diagram of a method 1100 for autonomous communication over a shared spectrum according to embodiments of the present disclosure. Steps of the method 1100 can be executed by a computing device (e.g., a processor, processing circuit, and/or other suitable component) of a wireless communication device, such as the BSs 105, 205, and 500 and the UEs 115, 215, and 400. The method 1100 may employ similar mechanisms as in the schemes 300, 600, and 900 described with respect to FIGS. 3, 6, and 9, respectively. As illustrated, the method 1100 includes a number of enumerated steps, but embodiments of the method 1100 may include additional steps before, after, and in between the enumerated steps. In some embodiments, one or more of the enumerated steps may be omitted or performed in a different order.

At step 1110, the method 1100 includes identifying a TXOP (e.g., the TXOP 306) in a shared spectrum (e.g., over the frequency band 340) shared by the plurality of network operating entities (e.g., Operator A and Operator B). For example, the wireless communication device (e.g., the BS 205*a* or the UE 215*a*) is associated with a first network operating entity (e.g., Operator A) of the plurality of the network operating entities.

At step 1120, the method 1100 includes communicating autonomous data (e.g., the autonomous data 730, 732, 810, and 920) with a second wireless communication device (e.g., the UE 215*a* or the BS 205*a*) associated with the first network operating entity during the TXOP without a priori reservation for the TXOP. The autonomous data may include UL URLLC data, SR, or a PRACH preamble) and may be communicated based on the schemes 300, 600, and/or 900.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Embodiments of the present disclosure further include a method of wireless communication including identifying, by a first wireless communication device associated with a first network operating entity of a plurality of network operating entities, a transmission opportunity (TXOP) in a shared spectrum shared by the plurality of network operating entities; identifying, by the first wireless communication device, a resource in the TXOP designated for autonomous communication; and communicating, by the first wireless communication device with a second wireless communication device associated with the first network operating entity, autonomous data during the TXOP using the resource.

The method further includes wherein the resource includes a frequency band in the shared spectrum, and wherein the frequency band is shared by the plurality of network operating entities for the autonomous communication. The method further includes wherein the communicating the autonomous data during the TXOP includes transmitting, by the first wireless communication device to the second wireless communication device in an uplink (UL) direction, the autonomous data. The method further includes monitoring, by the first wireless communication device in a sensing period of the TXOP, for a reservation for regular communication during the TXOP from the second wireless communication device; and contending, by the first wireless communication device, for the resource in the frequency band during the TXOP when there is no reservation for regular communication during the TXOP from the second wireless communication device. The method further includes detecting, by the first wireless communication device, a reservation for regular communication during the TXOP from the second wireless communication device; and contending, by the first wireless communication device, for the resource in the frequency band during a UL portion of the TXOP. The method further includes wherein the communicating the autonomous data during the TXOP includes receiving, by the first wireless communication device from the second wireless communication device in an uplink (UL) direction, the autonomous data. The method further includes wherein the resource includes a time period in the TXOP designated for the autonomous communication by the first network operating entity. The method further includes wherein the autonomous data is communicated without a prior reservation for the TXOP. The method further includes wherein the first network operating entity has priority among the plurality of network operating entities in the TXOP. The method further includes transmitting, by the first wireless communication device, a reservation signal to reserve another TXOP for regular communication, wherein the another TXOP includes a first time period and a second time period, and wherein the first time period is designated for autonomous communication; and communicating, by the first wireless communication device with a third wireless communication device associated with the first network operating entity, regular data during the second time period. The method further includes wherein a second network operating entity of the plurality of network operating entities has priority among the plurality of network operating entities in the another TXOP, and wherein the first time period of the another TXOP is designated for the autonomous communication by the second network operating entity. The method further includes wherein the autonomous data includes at least one of a random access preamble sequence or a scheduling request. The method further includes wherein the autonomous data includes the random access preamble sequence, and wherein the random access preamble sequence is associated with the first network operating entity. The method further includes wherein the autonomous data includes the random access preamble sequence, and wherein the random access preamble sequence is associated with the plurality of network operating entities.

Embodiments of the present disclosure further include a method of wireless communication including identifying, by a first wireless communication device associated with a first network operating entity of a plurality of network operating entities, a transmission opportunity (TXOP) in a shared spectrum shared by the plurality of network operating entities; and communicating, by the first wireless communication device, with a second wireless communication device associated with the first network operating entity, autonomous data in the TXOP without a prior reservation for the TXOP.

The method further includes wherein the communicating the autonomous data includes transmitting, by the first wireless communication device to the second wireless communication device, the autonomous data in the TXOP. The method further includes detecting, by the first wireless communication device, a reservation signal indicating a reservation for the TXOP from a second network operating entity of the plurality of network operating entities; and determining, by the first wireless communication device, a transmit power level according to a received power level of the reservation signal, wherein the autonomous data is transmitted at the transmit power level. The method further includes wherein the communicating the autonomous data includes receiving, by the first wireless communication device from the second wireless communication device, the autonomous data in the TXOP. The method further includes communicating, by the first wireless communication device with a third wireless communication device associated with the first network operating entity, a reservation for another TXOP for regular communication; receiving, by the first wireless communication device from the third wireless communication device, a signal carrying regular data during the another TXOP; and canceling, by the first wireless communication device, interference from the signal carrying the regular data, wherein the interference is associated with autonomous transmission of a second network operating entity of the plurality of network operating entities. The method further includes transmitting, by the first wireless communication device, a reservation to reserve another TXOP for autonomous communication. The method further includes receiving, by the first wireless communication device from a third wireless communication device associated with the first network operating entity, autonomous data during the another TXOP. The method further includes wherein the autonomous data includes a random access preamble sequence.

Embodiments of the present disclosure further include an apparatus comprising a processor configured to identify a transmission opportunity (TXOP) in a shared spectrum shared by a plurality of network operating entities, wherein the apparatus is associated with a first network operating entity of the plurality of network operating entities; and identify a resource in the TXOP designated for autonomous communication; and a transceiver configured to communicate, with a second wireless communication device associated with the first network operating entity, autonomous data during the TXOP using the resource.

The apparatus further includes wherein the resource includes a frequency band in the shared spectrum, and wherein the frequency band is shared by the plurality of network operating entities for the autonomous communication. The apparatus further includes wherein the transceiver is further configured to communicate the autonomous data during the TXOP by transmitting, to the second wireless communication device in an uplink (UL) direction, the autonomous data. The apparatus further includes wherein the processor is further configured to monitor, in a sensing period of the TXOP, for a reservation for regular communication during the TXOP from the second wireless communication device; and contend for the resource in the frequency band during the TXOP when there is no reservation for regular communication during the TXOP from the second wireless communication device. The apparatus further includes wherein the processor is further configured to detect a reservation for regular communication during the TXOP from the second wireless communication device; and contend for the resource in the frequency band during a UL portion of the TXOP. The apparatus further includes wherein the processor is further configured to communicate the autonomous data during the TXOP by receiving, from the second wireless communication device in an uplink (UL) direction, the autonomous data. The apparatus further includes wherein the resource includes a time period in the TXOP designated for the autonomous communication by the first network operating entity. The apparatus further includes wherein the autonomous data is communicated without a prior reservation for the TXOP. The apparatus further includes wherein the first network operating entity has priority among the plurality of network operating entities in the TXOP. The apparatus further includes wherein the transceiver is further configured to transmit a reservation signal to reserve another TXOP for regular communication, wherein the another TXOP includes a first time period and a second time period, and wherein the first time period is designated for autonomous communication; and communicate, with a third wireless communication device associated with the first network operating entity, regular data during the second time period. The apparatus further includes wherein a second network operating entity of the plurality of network operating entities has priority among the plurality of network operating entities in the another TXOP, and wherein the first time period of the another TXOP is designated for the autonomous communication by the second network operating entity. The apparatus further includes wherein the autonomous data includes at least one of a random access preamble sequence or a scheduling request. The apparatus further includes wherein the autonomous data includes the random access preamble sequence, and wherein the random access preamble sequence is associated with the first network operating entity. The apparatus further includes wherein the autonomous data includes the random access preamble sequence, and wherein the random access preamble sequence is associated with the plurality of network operating entities.

Embodiments of the present disclosure further include an apparatus including a processor configured to identify a transmission opportunity (TXOP) in a shared spectrum shared by a plurality of network operating entities, wherein the apparatus is associated with a first network operating entity of the plurality of network operating entities; and a transceiver configured to communicate, with a second wireless communication device associated with the first network operating entity, autonomous data in the TXOP without a prior reservation for the TXOP.

The apparatus further includes wherein the processor is further configured to communicate the autonomous data by transmitting, to the second wireless communication device, the autonomous data in the TXOP. The apparatus further includes wherein the processor is further configured to detect a reservation signal indicating a reservation for the TXOP from a second network operating entity of the plurality of network operating entities; and determine a transmit power level according to a received power level of the reservation signal, wherein the autonomous data is transmitted at the transmit power level. The apparatus further includes wherein the processor is further configured to communicate the autonomous data by receiving, from the second wireless communication device, the autonomous data in the TXOP. The apparatus further includes wherein the transceiver is further configured to communicate, with a third wireless communication device associated with the first network operating entity, a reservation for another TXOP for regular communication; receive, from the third wireless communication device, a signal carrying regular data during the another TXOP; and cancel interference from the signal carrying the regular data, wherein the interference is associated with autonomous transmission of a second network operating entity of the plurality of network operating entities. The apparatus further includes wherein the transceiver is further configured to transmit a reservation to reserve another TXOP for autonomous communication. The apparatus further includes wherein the transceiver is further configured to receive, from a third wireless communication device associated with the first network operating entity, autonomous data during the another TXOP. The apparatus further includes wherein the autonomous data includes a random access preamble sequence.

Embodiments of the present disclosure further include a computer-readable medium having program code recorded thereon, the program code including code for causing a first wireless communication device associated with a first network operating entity of a plurality of network operating entities to identify a transmission opportunity (TXOP) in a shared spectrum shared by the plurality of network operating entities; code for causing the first wireless communication device to identify a resource in the TXOP designated for autonomous communication; and code for causing the first wireless communication device to communicate with a second wireless communication device associated with the first network operating entity, autonomous data during the TXOP using the resource.

The computer-readable medium further includes wherein the resource includes a frequency band in the shared spectrum, and wherein the frequency band is shared by the plurality of network operating entities for the autonomous communication. The computer-readable medium further includes wherein the code for communicating the autonomous data during the TXOP is further configured to transmit, by the first wireless communication device to the second wireless communication device in an uplink (UL) direction, the autonomous data. The computer-readable medium further includes code for causing the first wireless communication device to monitor, in a sensing period of the TXOP, for a reservation for regular communication during the TXOP from the second wireless communication device; and code for causing the first wireless communication device to contend for the resource in the frequency band during the TXOP when there is no reservation for regular communication during the TXOP from the second wireless communication device. The computer-readable medium further includes code for causing the first wireless communication device to detect a reservation for regular communication during the TXOP from the second wireless communication device; and code for causing the first wireless communication device to contend for the resource in the frequency band during a UL portion of the TXOP. The computer-readable medium further includes wherein the code for communicating the autonomous data during the TXOP is further configured to receive, by the first wireless communication device from the second wireless communication device in an uplink (UL) direction, the autonomous data. The computer-readable medium further includes wherein the resource includes a time period in the TXOP designated for the autonomous communication by the first network operating entity. The computer-readable medium further includes wherein the autonomous data is communicated without a prior reservation for the TXOP. The computer-readable medium further includes wherein the first network operating entity has priority among the plurality of network operating entities in the TXOP. The computer-readable medium further includes code for causing the first wireless communication device to transmit a reservation signal to reserve another TXOP for regular communication, wherein the another TXOP includes a first time period and a second time period, and wherein the first time period is designated for autonomous communication; and code for causing the first wireless communication device to communicate, with a third wireless communication device associated with the first network operating entity, regular data during the second time period. The computer-readable medium further includes wherein a second network operating entity of the plurality of network operating entities has priority among the plurality of network operating entities in the another TXOP, and wherein the first time period of the another TXOP is designated for the autonomous communication by the second network operating entity. The computer-readable medium further includes wherein the autonomous data includes at least one of a random access preamble sequence or a scheduling request. The computer-readable medium further includes wherein the autonomous data includes the random access preamble sequence, and wherein the random access preamble sequence is associated with the first network operating entity. The computer-readable medium further includes wherein the autonomous data includes the random access preamble sequence, and wherein the random access preamble sequence is associated with the plurality of network operating entities.

Embodiments of the present disclosure further include a computer-readable medium of wireless communication including code for causing a first wireless communication device associated with a first network operating entity of a plurality of network operating entities to identify a transmission opportunity (TXOP) in a shared spectrum shared by the plurality of network operating entities; and code for causing the first wireless communication device to communicate, with a second wireless communication device associated with the first network operating entity, autonomous data in the TXOP without a prior reservation for the TXOP.

The computer-readable medium further includes wherein the code for communicating the autonomous data is further configured to transmit, to the second wireless communication device, the autonomous data in the TXOP. The computer-readable medium further includes code for causing the first wireless communication device to detect a reservation signal indicating a reservation for the TXOP from a second network operating entity of the plurality of network operating entities; and code for causing the first wireless communication device to determine a transmit power level according to a received power level of the reservation signal, wherein the autonomous data is transmitted at the transmit power level. The computer-readable medium further includes wherein the code for communicating the autonomous data is further configured to receive, by the first wireless communication device from the second wireless communication device, the autonomous data in the TXOP. The computer-readable medium further includes code for causing the first wireless communication device to communicate, with a third wireless communication device associated with the first network operating entity, a reservation for another TXOP for regular communication; code for causing the first wireless communication device to receive, from the third wireless communication device, a signal carrying regular data during the another TXOP; and code for causing the first wireless communication device to cancel interference from the signal carrying the regular data, wherein the interference is associated with autonomous transmission of a second network operating entity of the plurality of network operating entities. The computer-readable medium further includes code for causing the first wireless communication device to transmit a reservation to reserve another TXOP for autonomous communication. The computer-readable medium further includes code for causing the first wireless communication device to receive, from a third wireless communication device associated with the first network operating entity, autonomous data during the another TXOP. The computer-readable medium further includes wherein the autonomous data includes a random access preamble sequence.

Embodiments of the present disclosure further include an apparatus including means for identifying a transmission opportunity (TXOP) in a shared spectrum shared by a plurality of network operating entities, wherein the apparatus is associated with a first network operating entity of the plurality of network operating entities; and means for identifying a resource in the TXOP designated for autonomous communication; and means for communicating, with a second wireless communication device associated with the first network operating entity, autonomous data during the TXOP using the resource.

The apparatus further includes wherein the resource includes a frequency band in the shared spectrum, and wherein the frequency band is shared by the plurality of network operating entities for the autonomous communication. The apparatus further includes wherein the means for communicating the autonomous data during the TXOP is further configured to transmit, to the second wireless communication device in an uplink (UL) direction, the autonomous data. The apparatus further includes means for monitoring, in a sensing period of the TXOP, for a reservation for regular communication during the TXOP from the second wireless communication device; and means for contending for the resource in the frequency band during the TXOP when there is no reservation for regular communication during the TXOP from the second wireless communication device. The apparatus further includes means for detecting a reservation for regular communication during the TXOP from the second wireless communication device; and means for contending for the resource in the frequency band during a UL portion of the TXOP. The apparatus further includes wherein the means for communicating the autonomous data during the TXOP is further configured to receive, from the second wireless communication device in an uplink (UL) direction, the autonomous data. The apparatus further includes wherein the resource includes a time period in the TXOP designated for the autonomous communication by the first network operating entity. The apparatus further includes wherein the autonomous data is communicated without a prior reservation for the TXOP. The apparatus further includes wherein the first network operating entity has priority among the plurality of network operating entities in the TXOP. The apparatus further includes means for transmitting a reservation signal to reserve another TXOP for regular communication, wherein the another TXOP includes a first time period and a second time period, and wherein the first time period is designated for autonomous communication; and means for communicating, with a third wireless communication device associated with the first network operating entity, regular data during the second time period. The apparatus further includes wherein a second network operating entity of the plurality of network operating entities has priority among the plurality of network operating entities in the another TXOP, and wherein the first time period of the another TXOP is designated for the autonomous communication by the second network operating entity. The apparatus further includes wherein the autonomous data includes at least one of a random access preamble sequence or a scheduling request. The apparatus further includes wherein the autonomous data includes the random access preamble sequence, and wherein the random access preamble sequence is associated with the first network operating entity. The apparatus further includes wherein the autonomous data includes the random access preamble sequence, and wherein the random access preamble sequence is associated with the plurality of network operating entities.

Embodiments of the present disclosure further include an apparatus including means for identifying a transmission opportunity (TXOP) in a shared spectrum shared by a plurality of network operating entities, wherein the apparatus is associated with a first network operating entity of the plurality of network operating entities; and means for communicating, with a second wireless communication device associated with the first network operating entity, autonomous data in the TXOP without a prior reservation for the TXOP.

The apparatus further includes wherein the means for communicating the autonomous data is further configured to transmit, to the second wireless communication device, the autonomous data in the TXOP. The apparatus further includes means for detecting a reservation signal indicating a reservation for the TXOP from a second network operating entity of the plurality of network operating entities; and means for determining a transmit power level according to a received power level of the reservation signal, wherein the autonomous data is transmitted at the transmit power level. The apparatus further includes wherein the means for communicating the autonomous data is further configured to receiving, from the second wireless communication device, the autonomous data in the TXOP. The apparatus further includes means for communicating, with a third wireless communication device associated with the first network operating entity, a reservation for another TXOP for regular communication; means for receiving, from the third wireless communication device, a signal carrying regular data during the another TXOP; and means for cancelling interference from the signal carrying the regular data, wherein the interference is associated with autonomous transmission of a second network operating entity of the plurality of network operating entities. The apparatus further includes means for transmitting a reservation to reserve another TXOP for autonomous communication. The apparatus further includes means for receiving, from a third wireless communication device associated with the first network operating entity, autonomous data during the another TXOP. The apparatus further includes wherein the autonomous data includes a random access preamble sequence.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   identifying, by a first wireless communication device associated with a first network operating entity of a plurality of network operating entities, a transmission opportunity (TXOP) in a shared spectrum shared by the plurality of network operating entities;
   identifying, by the first wireless communication device, a resource in the TXOP designated for autonomous communication without a prior reservation for the TXOP; and
   communicating, by the first wireless communication device with a second wireless communication device associated with the first network operating entity, autonomous data during the TXOP using the resource without a prior reservation for the TXOP.

2. The method of claim 1, wherein the resource includes a frequency band in the shared spectrum, and wherein the frequency band is shared by the plurality of network operating entities for the autonomous communication.

3. The method of claim 2, wherein the communicating the autonomous data during the TXOP includes transmitting, by the first wireless communication device to the second wireless communication device in an uplink (UL) direction, the autonomous data without a prior reservation for the TXOP.

4. The method of claim 2, wherein the communicating the autonomous data during the TXOP includes receiving, by the first wireless communication device from the second wireless communication device, the autonomous data without a prior reservation for the TXOP.

5. The method of claim 1, wherein the resource includes a time period in the TXOP designated for the autonomous communication by the first network operating entity, and wherein the first network operating entity has priority among the plurality of network operating entities in the TXOP.

6. The method of claim 5, further comprising:
   transmitting, by the first wireless communication device, a reservation signal to reserve another TXOP for regular communication, wherein the another TXOP includes a first time period and a second time period, and wherein the first time period is designated for autonomous communication; and
   communicating, by the first wireless communication device with a third wireless communication device associated with the first network operating entity, regular data during the second time period.

7. The method of claim 6, wherein a second network operating entity of the plurality of network operating entities has priority among the plurality of network operating entities in the another TXOP, and wherein the first time period of the another TXOP is designated for the autonomous communication by the second network operating entity without a prior reservation for the another TXOP.

8. The method of claim 1, wherein the autonomous data includes at least one of a scheduling request, a random access preamble sequence associated with the first network operating entity, or a random access preamble sequence associated with the plurality of network operating entities.

9. A method of wireless communication, comprising:
identifying, by a first wireless communication device associated with a first network operating entity of a plurality of network operating entities, a transmission opportunity (TXOP) in a shared spectrum shared by the plurality of network operating entities; and
communicating, by the first wireless communication device, with a second wireless communication device associated with the first network operating entity, autonomous data in the TXOP without a prior reservation for the TXOP.

10. The method of claim 9, wherein the communicating the autonomous data includes transmitting, by the first wireless communication device to the second wireless communication device, the autonomous data in the TXOP.

11. The method of claim 10, further comprising:
detecting, by the first wireless communication device, a reservation signal indicating a reservation for the TXOP from a second network operating entity of the plurality of network operating entities; and
determining, by the first wireless communication device, a transmit power level according to a received power level of the reservation signal,
wherein the autonomous data is transmitted at the transmit power level.

12. The method of claim 9, wherein the communicating the autonomous data includes receiving, by the first wireless communication device from the second wireless communication device, the autonomous data in the TXOP.

13. The method of claim 9, further comprising:
communicating, by the first wireless communication device with a third wireless communication device associated with the first network operating entity, a reservation for another TXOP for regular communication;
receiving, by the first wireless communication device from the third wireless communication device, a signal carrying regular data during the another TXOP; and
canceling, by the first wireless communication device, interference from the signal carrying the regular data, wherein the interference is associated with autonomous transmission of a second network operating entity of the plurality of network operating entities.

14. The method of claim 9, further comprising transmitting, by the first wireless communication device, a reservation to reserve another TXOP for autonomous communication.

15. The method of claim 14, further comprising receiving, by the first wireless communication device from a third wireless communication device associated with the first network operating entity, autonomous data during the another TXOP.

16. An apparatus comprising:
a processor configured to:
identify a transmission opportunity (TXOP) in a shared spectrum shared by a plurality of network operating entities, wherein the apparatus is associated with a first network operating entity of the plurality of network operating entities; and
identify a resource in the TXOP designated for autonomous communication without a prior reservation for the TXOP; and a transceiver configured to communicate, with a second wireless communication device associated with the first network operating entity, autonomous data during the TXOP using the resource without a prior reservation for the TXOP.

17. The apparatus of claim 16, wherein the resource includes a frequency band in the shared spectrum, and wherein the frequency band is shared by the plurality of network operating entities for the autonomous communication.

18. The apparatus of claim 17, wherein the transceiver is further configured to communicate the autonomous data during the TXOP by transmitting, to the second wireless communication device in an uplink (UL) direction, the autonomous data without a prior reservation for the TXOP.

19. The apparatus of claim 17, wherein the processor is further configured to communicate the autonomous data during the TXOP by receiving, from the second wireless communication device, the autonomous data without a prior reservation for the TXOP.

20. The apparatus of claim 16, wherein the resource includes a time period in the TXOP designated for the autonomous communication by the first network operating entity, and wherein the first network operating entity has priority among the plurality of network operating entities in the TXOP.

21. The apparatus of claim 20, wherein the transceiver is further configured to:
transmit a reservation signal to reserve another TXOP for regular communication, wherein the another TXOP includes a first time period and a second time period, and wherein the first time period is designated for autonomous communication; and
communicate, with a third wireless communication device associated with the first network operating entity, regular data during the second time period.

22. The apparatus of claim 21, wherein a second network operating entity of the plurality of network operating entities has priority among the plurality of network operating entities in the another TXOP, and wherein the first time period of the another TXOP is designated for the autonomous communication by the second network operating entity without a prior reservation for the another TXOP.

23. The apparatus of claim 16, wherein the autonomous data includes at least one of a scheduling request, a random access preamble sequence associated with the first network operating entity, or a random access preamble sequence associated with the plurality of network operating entities.

24. An apparatus comprising:
a processor configured to identify a transmission opportunity (TXOP) in a shared spectrum shared by a plurality of network operating entities, wherein the apparatus is associated with a first network operating entity of the plurality of network operating entities; and
a transceiver configured to communicate, with a second wireless communication device associated with the first network operating entity, autonomous data in the TXOP without a prior reservation for the TXOP.

25. The apparatus of claim 24, wherein the processor is further configured to communicate the autonomous data by transmitting, to the second wireless communication device, the autonomous data in the TXOP.

26. The apparatus of claim 25, wherein the processor is further configured to:
detect a reservation signal indicating a reservation for the TXOP from a second network operating entity of the plurality of network operating entities; and determine a transmit power level according to a received power level of the reservation signal, wherein the autonomous data is transmitted at the transmit power level.

27. The apparatus of claim 24, wherein the processor is further configured to communicate the autonomous data by receiving, from the second wireless communication device, the autonomous data in the TXOP.

28. The apparatus of claim 24, wherein the transceiver is further configured to:
communicate, with a third wireless communication device associated with the first network operating entity, a reservation for another TXOP for regular communication;
receive, from the third wireless communication device, a signal carrying regular data during the another TXOP; and
cancel interference from the signal carrying the regular data, wherein the interference is associated with autonomous transmission of a second network operating entity of the plurality of network operating entities.

29. The apparatus of claim 24, wherein the transceiver is further configured to transmit a reservation to reserve another TXOP for autonomous communication.

30. The apparatus of claim 29, wherein the transceiver is further configured to receive, from a third wireless communication device associated with the first network operating entity, autonomous data during the another TXOP.

\* \* \* \* \*